United States Patent
Miyazawa (10) Patent No.: US 7,995,148 B2
(45) Date of Patent: Aug. 9, 2011

(54) IMAGE PROCESSING APPARATUS AND IMAGE PROCESSING METHOD

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1053 days.

(21) Appl. No.: 11/808,344

(22) Filed: Jun. 8, 2007

(65) Prior Publication Data

US 2008/0152227 A1    Jun. 26, 2008

(30) Foreign Application Priority Data

Dec. 22, 2006  (JP) .................................. 2006-346398

(51) Int. Cl.
*H04N 5/21* (2006.01)

(52) U.S. Cl. ......... 348/607; 348/624; 348/625; 348/630

(58) Field of Classification Search .................. 348/607, 348/624, 630, 625, 708, 712, 725, 713, 728; 382/190, 232, 162, 254, 260, 266, 275; *H04N 5/21, H04N 9/64, 9/77, 5/44*
See application file for complete search history.

(56) References Cited

U.S. PATENT DOCUMENTS

| 6,813,335 | B2 | 11/2004 | Shinbata |
| 7,031,551 | B2 * | 4/2006 | Yano et al. ..................... 348/607 |
| 2003/0044087 | A1 * | 3/2003 | Kondo et al. ................. 382/254 |
| 2003/0053159 | A1 | 3/2003 | Ito |
| 2003/0179945 | A1 | 9/2003 | Akahori |

FOREIGN PATENT DOCUMENTS

| JP | 2002-314816 | 10/2002 |
| JP | 2003-076985 | 3/2003 |
| JP | 2003-076992 | 3/2003 |
| JP | 2003-281531 | 10/2003 |
| JP | 2005-141659 | 6/2005 |

* cited by examiner

*Primary Examiner* — Sherrie Hsia
(74) *Attorney, Agent, or Firm* — Pillsbury Winthrop Shaw Pittman LLP (57) ABSTRACT

An image signal is resolved into a plurality of frequency components whose spatial frequencies are different from each other; a variation component of the image signal is extracted based on each of the plurality of frequency components, an absolute value of the variation component being smaller than a predetermined reference value; a level difference amount of the image signal is calculated based on the extracted variation component; and the calculated level difference amount is subtracted from the image signal.

10 Claims, 6 Drawing Sheets

IMAGE PROCESSING APPARATUS AND IMAGE PROCESSING METHOD

CROSS-REFERENCE TO RELATED APPLICATION

This application is based upon and claims the benefit of priority from the prior Japanese Patent Application No. 2006-346398, filed on Dec. 22, 2006; the entire contents of which are incorporated herein by reference.

BACKGROUND OF THE INVENTION

1. Field of the Invention

The present invention relates to an image processing apparatus and an image processing method for processing an image.

2. Description of the Related Art

In order to improve a quality of an image, the image may be processed. There is disclosed a technology, for example, in which roughness of an image is suppressed and sharpness is enhanced by resolving image data into a low frequency component, a middle frequency component, and a high frequency component to perform a processing (for example, see JP-A 2003-281531 (KOKAI)).

BRIEF SUMMARY OF THE INVENTION

Here, a slight level difference of a tone may exist in a plain region of an image. Such a level difference (boundary) of the tone becomes a cause of a mach band. When different tones are disposed sequentially in a space, the boundary thereof is recognized as a stripe even if a difference between the tones is slight. The mach band is easy to occur particularly in a digital picture, which is constituted with discrete data.

An object of the present invention is to provide an image processing apparatus and an image processing method to decrease a level difference of a tone in an image.

An image processing apparatus according to an embodiment of the present invention includes: a resolution unit resolving an image signal into a plurality of frequency components whose spatial frequencies are different from each other; an extracting unit extracting a variation component of the image signal based on each of the plurality of frequency components, an absolute value of the variation component being smaller than a predetermined reference value; a calculating unit calculating a level difference amount of the image signal based on the extracted variation component; and a subtracting unit subtracting the calculated level difference amount from the image signal.

An image processing method according to an embodiment of the present invention includes: resolving an image signal into a plurality of frequency components whose spatial frequencies are different from each other; extracting a variation component of the image signal based on each of the plurality of frequency components, an absolute value of the variation component being smaller than a predetermined reference value; calculating a level difference amount of the image signal based on the extracted variation component; and subtracting the calculated level difference amount from the image signal.

DETAILED DESCRIPTION OF THE INVENTION

First Embodiment

Hereinafter, an embodiment of the preset invention will be described in detail with reference to the drawings.

Figure 1:
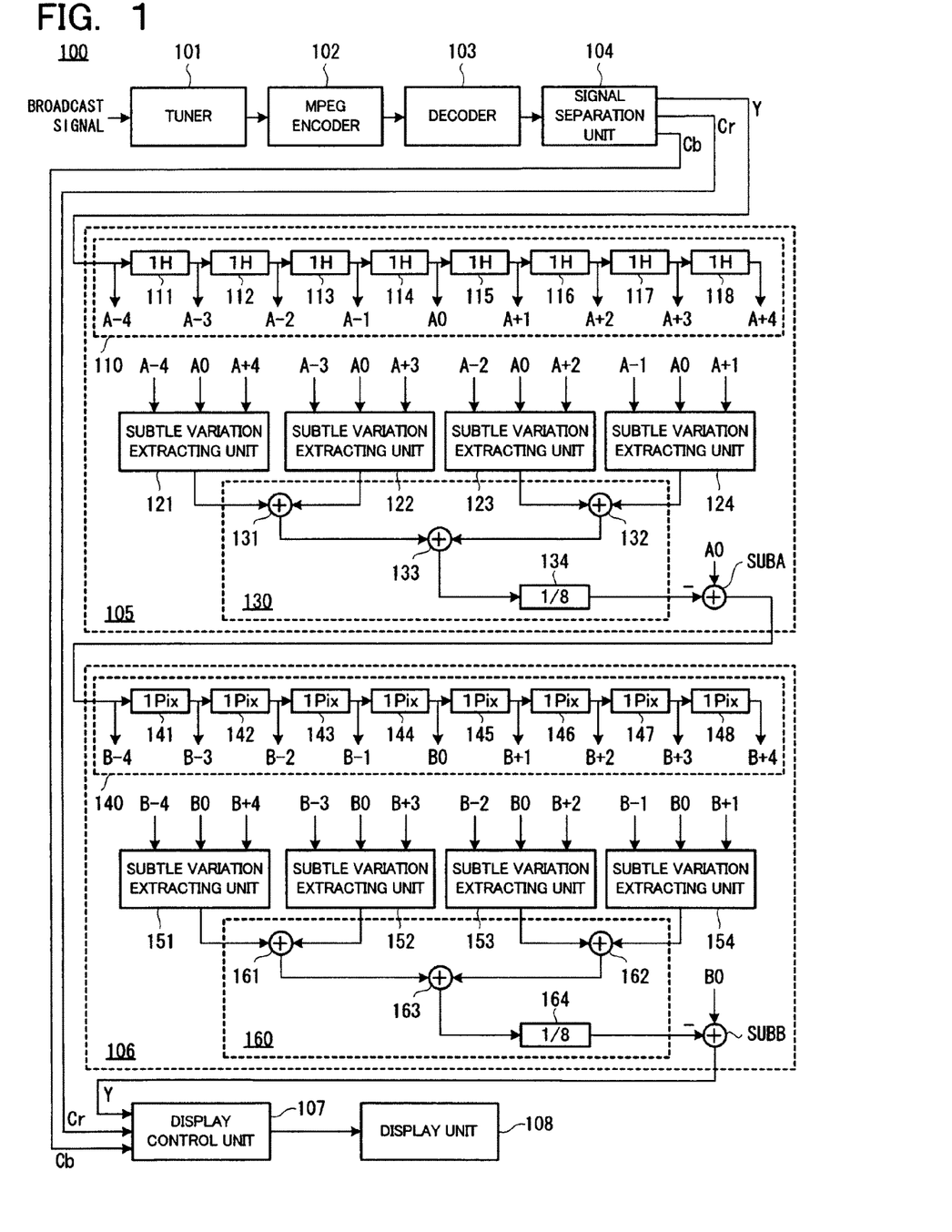
FIG. 1 is a block diagram showing an image processing apparatus according to a first embodiment of the present invention.

FIG. 1 is a block diagram showing an image processing apparatus 100 according to a first embodiment of the present invention. The image processing apparatus 100 has a tuner 101, an MPEG encoder 102, a decoder 103, a signal separation unit 104, a vertical processing unit 105, a horizontal processing unit 106, a display control unit 107, and a display unit 108.

The tuner 101 receives a broadcast signal, selects and outputs a broadcast channel. The encoder 102 encodes the broadcast signal outputted from the tuner 101 to compression coded data such as MPEG (Moving Picture Experts Group) 2. The decoder 103 decodes the compressed coded signal data outputted from the encoder 102 to a signal (picture signal) in a form displayable by the display unit 108.

The signal separation unit 104 separates the picture signal into a luminance signal Y and color signals Cr, Cb. The luminance signal Y is a signal indicating a luminance of the image. The color signals Cr, Cb are a B-Y color difference signal and an R-Y color difference signal respectively and indicate color differences of the image. The luminance signal Y and the color signals Cr, Cb include pixel signals indicating the luminance and the color per pixel respectively. The pixel signal is a signal to control the pixel being a unit for display in the display unit 108.

The vertical processing unit 105 processes the luminance signal Y outputted from the signal separation unit 104 to decrease a level difference of a tone in a vertical direction of the image. The horizontal processing unit 106 processes the luminance signal Y processed by the vertical processing unit 105 to decrease the level difference of the tone in a horizontal direction of the image. As will be stated later, the color signals Cr, Cb can be processed in addition to the luminance signal Y. Here, the luminance signal Y is processed in an order of the vertical direction and the horizontal direction. This order of the processings can be reversed or the processings can be performed parallelly. Details of the vertical processing unit 105 and the horizontal processing unit 106 will be described later.

The display control unit 107 controls display in the display unit 108. The display unit 108 is a display element such as a CRT and a liquid crystal display device. An image of a horizontal pixel number Nh and a vertical pixel number Nv is displayed in the display unit 108.

(Details of Vertical Processing Unit 105 and Horizontal Processing Unit 106)

The vertical processing unit 105 has a frequency component resolution unit 110, subtle variation extracting units 121 to 124, an averaging unit 130 and a subtracting unit SUBA, and decreases the subtle level difference in the vertical direction.

The frequency component resolution unit 110 has delay elements 111 to 118. The delay elements 111 to 118 are line memories, for example, and delay the luminance signal Y by one pixel in the vertical direction. Here, the luminance signal Y is delayed by one pixel in the vertical direction, by the luminance signal Y being delayed by Nh horizontal pixels in the horizontal direction.

By using eight delay elements 111 to 118, ±4 pixels of delay are generated in the vertical direction. As a result, with a pixel signal $A_0$ to be processed being a reference, four groups of frequency components ($A_{-i}$, $A_0$, $A_{+i}$) are extracted (i=1 to 4). Incidentally, it is possible to use five or more groups of frequency components as will be described later.

The frequency component ($A_{-i}$, $A_0$, $A_{+i}$) is a group of pixel signals, the frequency component being of from a short wavelength (high frequency) to a long wavelength (low frequency) in an order of a subscript "i". The pixel signals $A_0$, $A_{\pm i}$ mean pixel signals in a pixel $P_0$ to be processed and pixels $P_{\pm i}$ displaced from the pixel $P_0$ by a pixel number ±i in the vertical direction.

Incidentally, since the pixel signals in the luminance signal Y are sequentially inputted to the frequency component resolution unit 110, every pixel signal becomes the pixel signal $A_0$ to be processed.

The subtle variation extracting units 151 to 154 are inputted four groups of frequency components ($B_{-i}$, $B_0$, $B_{+i}$) respectively, and each subtle variation extracting unit extracts a subtle variation amount in a neighborhood of the pixel $P_0$ in the frequency component.

Figure 2:
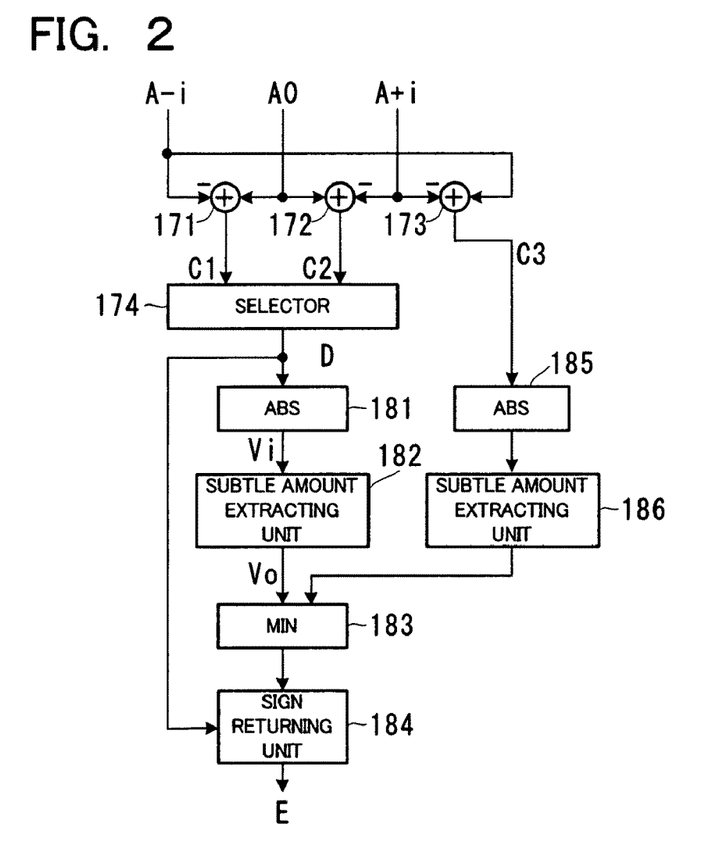
FIG. 2 is a block diagram showing an example of an internal configuration of a subtle variation extracting unit.

FIG. 2. is a block diagram showing an example of an internal configuration of the subtle variation extracting units 151 to 154. The subtle variation extracting units 151 to 154 have subtracting units 171 to 173, a selector 174, absolute value calculating units 181, 185, subtle amount extracting units 182, 186, a minimum value calculating unit 183, and a sign returning unit 184.

Each of the subtracting units 171 to 173 calculates values C1 to C3 being differences of the pixel signals $A_{-i}$, $A_0$, $A_{+i}$ in accordance with a following formula (1).

$$C1 = A_0 - A_{-i}$$

$$C2 = A_0 - A_{+i}$$

$$C3 = A_{-i} - A_{+i} \qquad \text{formula (1)}$$

The values C1 and C2 mean variation amounts of the luminance from the luminance of the pixel $P_0$, while the value C3 means whether the luminance in a neighborhood of the pixel $P_0$ goes up (in an increasing trend) or goes down (in a decreasing trend). The selector 174 outputs the larger in the absolute value of the values C1 and C2, as a value D.

The value C3 and the value D outputted from the selector 174 mean the variation amounts of the luminance in the neighborhood of the pixel $P_0$. This variation amount may represent a level difference of the luminance. As will be described later, outputs from the subtle variation extracting units 121 to 124 are averaged in the averaging unit 130 so that the variation amount has a meaning as the level difference of the luminance.

The absolute value calculating units 181, 185 calculate absolute values of the value D and the value C3 respectively. This is for the purpose of facilitating processings in the subtle amount extracting units 182, 186 by eliminating signs of the values D and C3.

The subtle amount extracting units 182, 186 correct the values D and C3 and extract subtle amounts.

Figure 3:
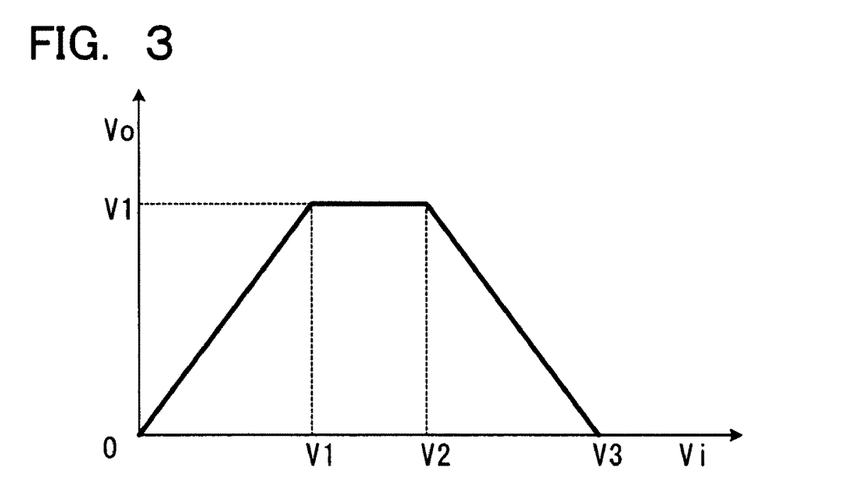
FIG. 3 is a graph showing a relation between an input value Vi and an output value Vo in a subtle amount extracting part.

FIG. 3 is a graph showing a relation between an input value Vi and an output value Vo in the subtle amount extracting units 182, 186. As for a value equal to or under a reference value V1, the input value Vi and the output value Vo are equal (the input value Vi is outputted without change). In this case, the value equal to or under the reference value V1 is extracted without change as the level difference. When the input value Vi exceeds the reference value V1, the output value Vo is fixed to be the reference value V1 (rounding off of the output). In other words, there is a trend that the value larger than the reference value V1 is not extracted as the subtle value. Further, if the input value Vi exceeds a reference value V2 (turn-around value), the output value Vo becomes small and converges to "0 (zero)" at a reference value V3.

The input value Vi can be classified as follows in accordance with the reference values V1 to V3.

(1) Extraction Region (0 to V1)

In this region, the input value Vi is outputted without change. In other words, the input value Vi is extracted as the subtle amount.

(2) Non-extraction Region (>V3)

In this region, the input value Vi is not outputted. In other words, the input value Vi is not extracted as the subtle amount.

(3) Boundary Region (V1 to V3)

This region is a boundary of the extraction region and the non-extraction region, and the input value Vi is reduced and outputted. This is a kind of region for buffering. There is a possibility that a noise occurs in an image when the extraction region and the non-extraction region are directly connected.

This boundary region can be further classified into two regions.

1) Constant Region (V1<V2)

In this region, the output value Vo is constant (V1) irrespective of the input value Vi.

2) Decreasing Region (V2<V3)

In this region, the output value Vo decreases in correspondence with increase of the input value Vi.

The boundary region is classified as above in order to connect the extraction region and the non-extraction region smoothly so that unnecessary occurrence of the noise in the image is prevented. Here, the boundary region is classified by a combination of two straight lines (linear function), but the boundary region can be classified by a combination of three or more straight lines. It is also possible to express a relation between the input value Vi and the output value Vo in the boundary region by curved lines (polynomial function of degree greater than one, or the like). Further, the relation between the input value Vi and the output value Vo in both the extraction region and the boundary region can be expressed by curved lines (polynomial function of degree greater than one, or the like). In this case, a boundary between these regions becomes unclear.

For reference amounts V1, V2, V3, values appropriate for a purpose of the subtle amount extraction are adopted. For example, when a maximum value of the value D is "$2^{10}-1$" (10 bit), "4", "5", and "9", for example, can be adopted as the reference amounts V1, V2, V3. In this example, ratios R1, R2, R3 (V1/Dmax, V2/Dmax, V3/Dmax) of the reference amounts V1, V2, V3 to the maximum value of the value D are $3.9 \times 10^{-3}$, $4.9 \times 10^{-3}$, and $8.8 \times 10^{-3}$. Considering the purpose of the subtle amount extractions, it is preferable that the ratio R1 is sufficiently smaller than "1". The ratios R1, R2, R3 are to be about 1/100 or 1/50, for example. If the ratios R1, R2, R3 are small to a certain degree, the reference amounts V1, V2, V3 can be appropriately determined as necessary. For example, when the maximum value of the value D is "$2^{10}-1$", it is possible to determine the reference value V1 to be "7" and the reference values V2, V3 to be "7", "16", in correspondence therewith.

The minimum value calculating unit 183 outputs the smaller in the absolute value of values Do and C3o which correspond to the values D and C3 extracted (corrected) in the subtle value extracting units 182, 186. This is a measure for preventing the processed pixel signal from being a noise to the image by minimizing the value to be corrected.

Here, it is possible to integrate functions of the minimum value calculating unit 183, the absolute value calculating unit 185 and the subtle amount extracting unit 186 into the selector 174. This is because the value is selected from the values D and C3 to which the same processings (absolute value calculation, subtle amount extraction) are performed in the minimum value calculating unit 183.

If the function of the minimum value calculating unit 183 is integrated into the selector 174, the values C1 to C3 are inputted to the selector 174 and the value D is selected based on following conditions (1), (2) (the minimum value calculating unit 183, the absolute value calculating unit 185 and the subtle amount extracting unit 186 are omitted).

(1) A case that the absolute value of the value C3 is larger than both of the absolute values of the values C1 and C2 ($|C3|>|C1|,|C2|$)

In this case, in the neighborhood of the pixel $P_0$ corresponding to the pixel signal $A_0$, an intensity of the pixel signal goes up or goes down (in the increasing trend or in the decreasing trend). In this case, the larger in the absolute value of the values C1 and C2 is selected. In other words, with the pixel signal $A_0$ being a reference, the value with the larger variation amount is selected. It is considered that the larger in the absolute value represents an actual status of the level difference of the luminance.

(2) A case that the absolute value of the value C3 is smaller than at least either one of the absolute values of the values C1 and C2 ($|C3|<\max(|C1|,|C2|)$)

In this case, in the neighborhood of the pixel $P_0$ corresponding to the pixel signal $A_0$, with the pixel $P_0$ being a center, the intensities of the pixel signals draw a mound shape or a bowl shape (neither in the increasing trend nor in the decreasing trend). In this case, the value C3 is selected as the value D. In other words, a difference between the pixel signals $A_{\pm i}$ of pixels $P_{\pm i}$ in both ends of the pixel $P_0$ is selected. The pixel signal (luminance value) $A_0$ is neglected since the pixel signal (luminance value) $A_0$ itself in the pixel $P_0$ is considered not to contribute to the level difference of the luminance within the image.

The sign returning unit 184 returns signs deleted by the acquisition of the absolute value in the absolute value calculating units 181, 185. As a result, a value E is outputted from the sign returning unit 184 (subtle variation extracting units 121 to 124). The outputs from the subtle variation extracting units 121 to 124 respectively are denoted by values E1 to E4.

As shown in a following formula (2), the averaging unit 130, averages the subtle variations E1 to E4 of the luminance per frequency component from the subtle variation extracting units 121 to 124, and further multiplies the average value by ($\frac{1}{2}$) to calculate a value F. The value F has a meaning as a subtle level difference of the luminance in the vertical direction.

$$F=((E1+E2+E3+E4)/4)/2 \qquad \text{formula (2)}$$

The average value is multiplied by ($\frac{1}{2}$) because it is taken in consideration that the pixel signal $A_0$ includes the level differences of the luminance in both the vertical direction and the horizontal direction. As will be stated later, also in the horizontal direction similarly to in the vertical direction, values G1 to G4 being subtle variations of the luminance per frequency component are calculated by the subtle variation extracting units 151 to 154. As shown in a following formula (3), the averaging unit 160 calculates a value H from these values G1 to G4.

$$H=((G1+G2+G3+G4)/4)/2 \qquad \text{formula (3)}$$

A sum K (=F+H) of these values F and H has a meaning as the level difference of the luminance in both the vertical and horizontal directions. As shown in a following formula (4), this value K is an average of the subtle variations E1 to E4 and G1 to G4 of the luminance per frequency component in both the vertical and horizontal directions.

$$K=F+H=(E1+\ldots+E4+G1+\ldots+G4)/8 \qquad \text{formula (4)}$$

As stated above, as for ($\frac{1}{2}$) in the formula (2), it is taken into consideration that the level differences not only in the vertical direction but also in the horizontal direction are included in the pixel signal $A_0$.

The subtle level difference is obtained by such averaging. The level difference of the luminance is typically as follows. That is, the luminance varies between neighboring pixels and the luminance therearound is kept approximately constant even in different pixels. That is, the level difference of the luminance appears in a range from a high frequency to a certain degree of low frequency in terms of a spatial frequency of the luminance. As a result, by averaging the subtle variations of the luminance per frequency component, an amount included in every one of these components, that is, the level difference of the luminance can be obtained as the value E.

Here, the level difference of the luminance is extracted based on the average of the subtle variations in the spatial frequencies in the range of ±4 pixels. It is considered to broaden this range of the spatial frequencies. For example, it is considered to obtain an average for the spatial frequencies in a rage of ±5 or more pixels. This means extracting the level difference based on the broader range of frequency components and there is a possibility that accuracy of extraction is enhanced.

However, if the range of the frequency components is too broad, there is a possibility that the accuracy of the extraction is contrarily reduced. It is because it is highly possible that the level difference of the luminance to be extracted is not included in the component of a frequency lower than a frequency in which the level difference of the luminance appears. For example, if the level difference of the luminance appears on the display per 50 pixels, information of the level difference is considered not to be included in a spatial frequency component in a range of ±25 or more pixels.

The averaging unit 130 averages the subtle variations E1 to E4 without weighting. Here, as shown in a following formula (5), the value F can be calculated by weighted-averaging the subtle variations E1 to E4.

$$F=(m1*E1+m2*E2+m3*E3+m4*E4)$$
$$/((m1+m2+m3+m4)*2) \qquad \text{formula (5)}$$

Here, m1 to m4 are weights. It is preferable that these weights m1 to m4 are large in a high frequency side and small in a low frequency side. As previously stated, there is a possibility that the level difference included in the frequency component of the low frequency is small.

By subtracting the value F from the pixel signal $A_0$, the subtracting unit SUBA eliminates the component of the subtle level difference in the vertical direction from the original signal $A_0$. Hereby, the subtle level difference reducing processing in the vertical component ends.

The horizontal processing unit 106 has a frequency component resolution unit 140, subtle variation extracting units 151 to 154, an averaging unit 160, a subtracting unit SUBB, and processes the luminance signal processed by the vertical processing unit 105. The horizontal processing unit 106 reduces a subtle level difference in the horizontal direction similarly to in the vertical direction, with a pixel signal $B_0$ to be processed being a reference.

The frequency component resolution unit 140 has delay elements 141 to 148. The delay elements 141 to 148 delay a luminance signal Y by one pixel in the horizontal direction. By using the delay elements 141 to 148, ±4 pixels of delay are generated in the horizontal direction. As a result, with the pixel signal $B_0$ to be processed being a reference, four groups of frequency components ($B_{-i}$, $B_0$, $B_{+i}$) are extracted (i=1 to 4).

The four groups of the frequency components ($B_{-i}$, $B_0$, $B_{+i}$) are inputted to the subtle variation extracting units 151 to 154 so that values G1 to G4 being subtle variations of the luminance per frequency component in the horizontal direction are calculated. In accordance with the above-described formula (3), the averaging unit 160 calculates from these values G1 to G4 a value H being a subtle level difference of the luminance in the horizontal direction.

The subtracting unit SUBB eliminates the component of the subtle level difference in the horizontal direction from the pixel signal $B_0$ by subtracting the value H from the pixel signal $B_0$. As a result, the subtle level differences of the luminance in the vertical direction and the horizontal direction are eliminated from the pixel signal $A_0$.

A processing content in the horizontal processing unit 106 is not substantially different from that in the vertical processing unit 105, and other detailed description will be refrained.

For example, when an image with a small number of tones is viewed, the subtle level difference of the luminance may be recognized. In particular, when the subtle tone level difference is disposed in a plain part such as blue sky in the image, the tone level difference is recognized as a mach band by a human. By the vertical processing unit 105 and the horizontal processing unit 106, the subtle level difference components both in the vertical direction and the horizontal direction are reduced from the luminance signal Y (smoothing of the tone level difference). As a result, the mach band in the image is reduced.

Figure 4:
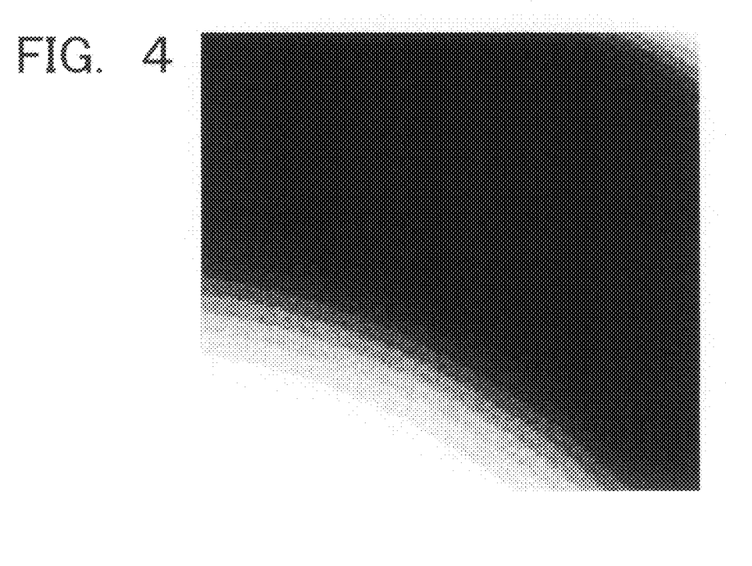
FIG. 4 is a view showing an example of an image before processings in a vertical processing unit and a horizontal processing unit.
Figure 5:
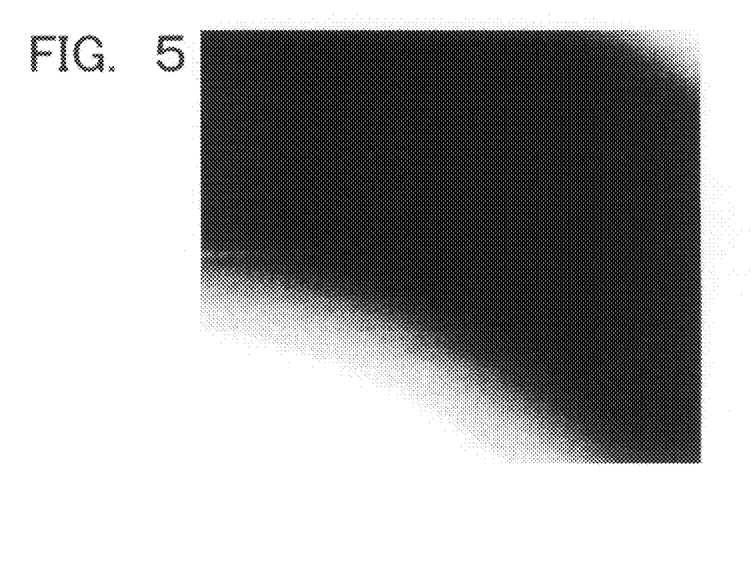
FIG. 5 is a view showing an example of an image after the processings in the vertical processing unit and the horizontal processing unit.

FIG. 4 and FIG. 5 are views showing examples of images before and after the processings in the vertical processing unit 105 and the horizontal processing unit 106. In FIG. 4, the level difference of the luminance is viewed in the image, while in FIG. 5 the level difference of the luminance in the image is reduced.

If the image with the low number of tones is displayed with a high number of tones, the subtle level difference reducing processings in the vertical processing unit 105 and the horizontal processing unit 106 become particularly effective. A displayable number of tones by the display unit 108 may be larger than a number of tones in an original image. In such a case, in reducing the subtle level difference in the image, a tone which is not used in the original image can be used. As a result, the subtle level difference (mach band) is reduced without destroying detail information existing in a high frequency zone.

The reason for occurrence of discrepancy between the tone number of the image itself and the tone number in the display unit 108 is, for example, that the broadcast signal is being of multiple bit. In other words, the broadcast signal or the like is being of multiple-bit due to a progress in technology (for example, miniaturization in semiconductor technology). For example, the tone number of the broadcast signal is changed from 8 to 10 bit to 12 to 14 bit. In this case, there is a possibility that image data produced for a low-bit broadcast signal are transmitted by a high-bit broadcast signal. As another reason for the occurrence of discrepancy between the tone number of the image and tone number in the display, there can be cited compression of information for efficiency of transmission or the like. In other words, the image data which are originally of high bit are rounded off to those of low bit.

MODIFICATION EXAMPLE

Figure 6:
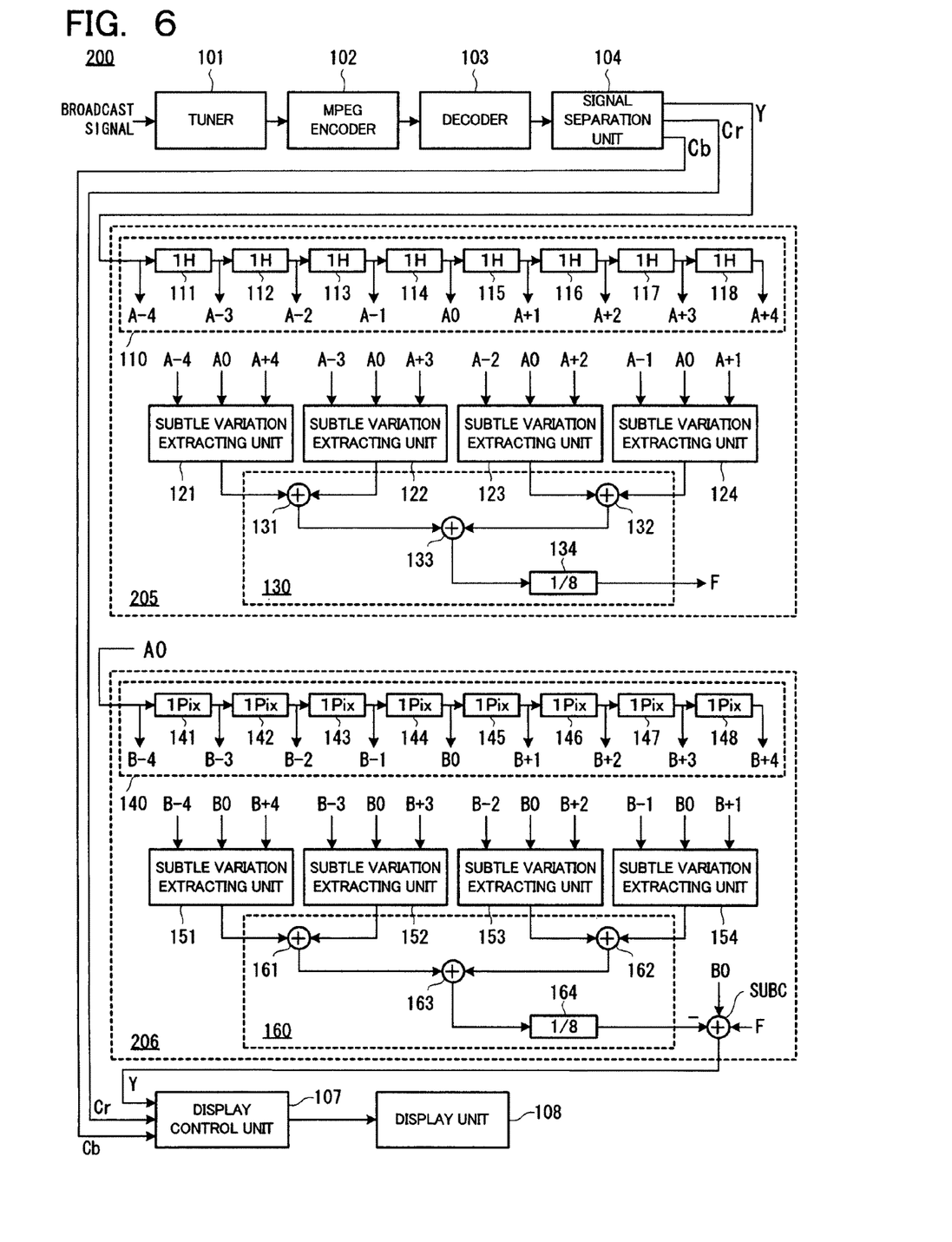
FIG. 6 is a block diagram showing an image processing apparatus according to a modification example of the first embodiment of the present invention.

FIG. 6 is a block diagram showing an image processing apparatus 200 according to a modification example of the first embodiment of the present invention.

In the first embodiment, for surely reducing the level difference from the picture signal, the subtle level differences are sequentially reduced in the vertical direction and the horizontal direction. On the other hand, in the present embodiment, subtle level differences are parallelly reduced in the horizontal direction and the vertical direction for an image signal.

Unlike the vertical processing unit 105, a vertical processing unit 205 does not have a subtracting unit SUBA. In other words, the vertical processing unit 205 only calculates a subtle level difference and does not reduce the subtle level difference from a pixel signal $A_0$.

To a horizontal processing unit 206, the pixel signal $A_0$ is inputted. It is possible to input a luminance signal Y as it is to the vertical processing unit 206, but labor for timing adjustment later in a subtracting unit SUBC becomes large (increase of a delay amount). In the subtracting unit SUBC, subtle level difference components from averaging units 130, 160 are eliminated from a pixel signal $B_0$ from a delay element 144. At this occasion, the subtracting unit SUBC delays the subtle level difference component from the averaging unit 160 in a manner that the pixel signal $B_0$ being a reference and the subtle level difference components from the averaging units 130, 160 correspond to each other.

As in this modification example, it is possible to parallelly extract the subtle level difference in both the horizontal direction and the vertical direction. Incidentally, if the image processing apparatus 200 has an enhancer circuit or the like, a circuit scale can be reduced by sharing delay elements 141 to 148 with the enhancer circuit or the like.

Second Embodiment

Figure 7:
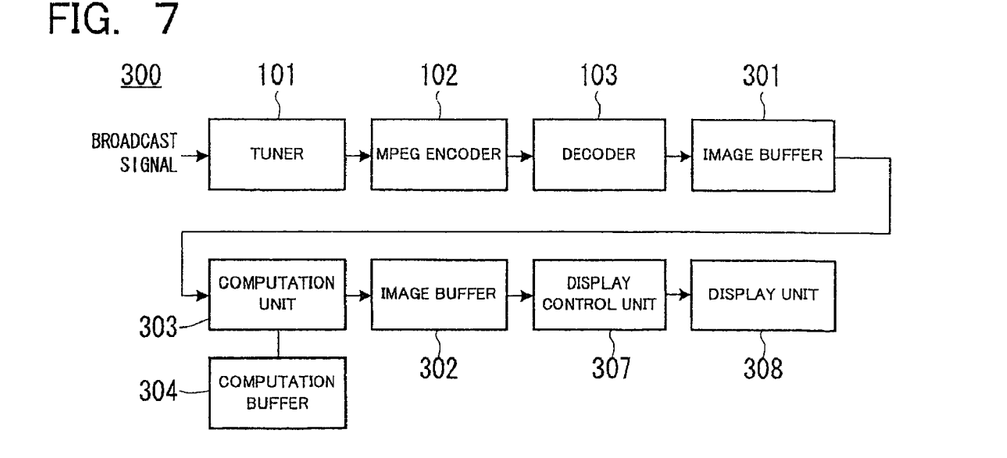
FIG. 7 is a block diagram showing an image processing apparatus according to a second embodiment of the present invention.

FIG. 7 is a block diagram showing an image processing apparatus 300 according to a second embodiment of the present invention. The image processing apparatus 300 has a tuner 101, an MPEG encoder 102, a decoder 103, image buffers 301, 302, a computation unit 303, a computation buffer 304, a display control unit 307, and a display unit 308.

The image buffers 301, 302 are storage devices storing an image, for example, semiconductor memories. The computation unit 303 reduces a subtle level difference from the image stored by the storage device and performs writing to the image buffer 302. The computation unit 303 can be constituted with hardware such as DSP (Digital Signal Processor). Also, the computation unit can be realized by a combination of hardware (for example, CPU (Central Processing Unit)) and software (program).

The computation buffer 304 is a buffer memory for calculation in the computation unit 303. The display control unit 307 displays the image written into the image buffer 302 on the display unit 308. The display unit 308 is a display element such as a CRT and a liquid crystal display device.

Figure 8:
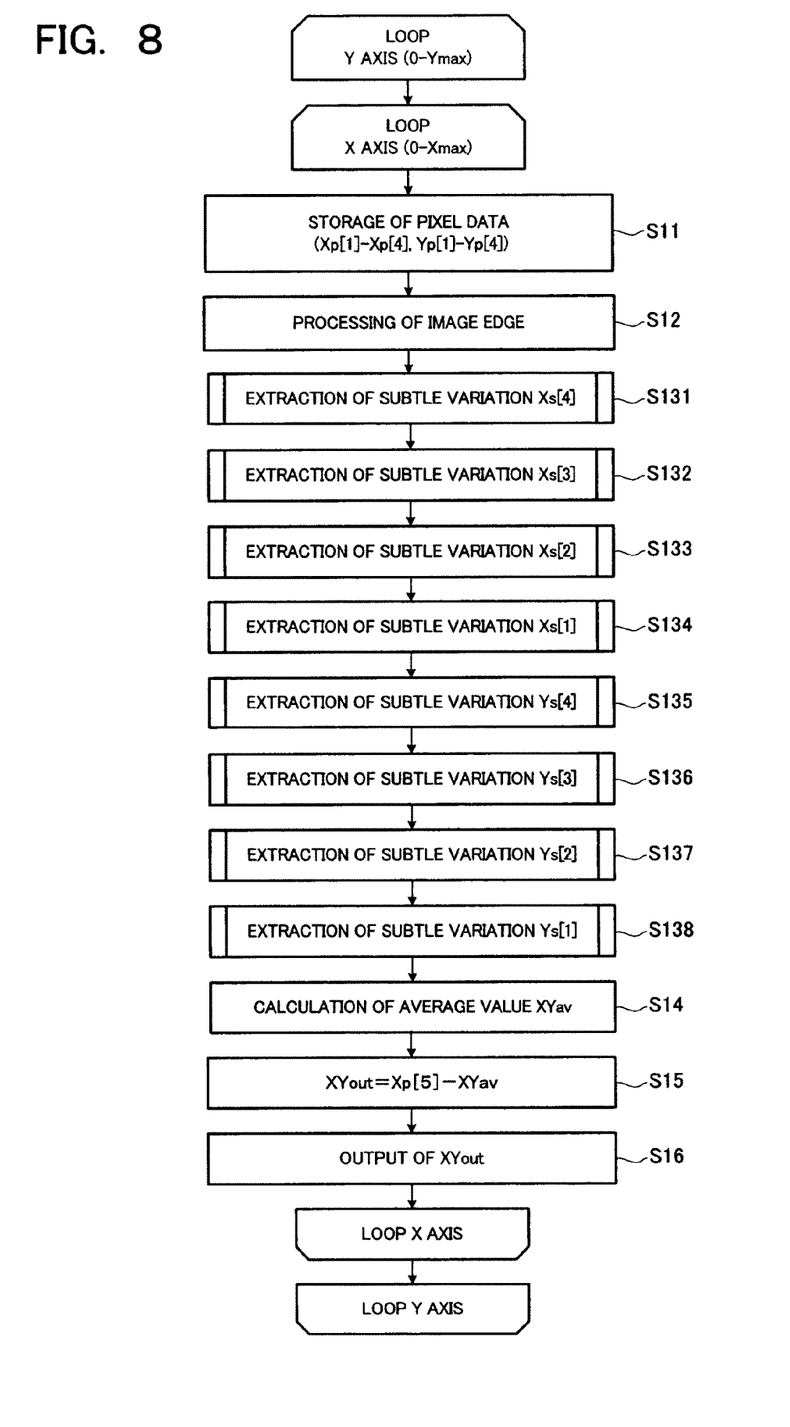
FIG. 8 is a flowchart showing an example of a processing procedure in a computation unit.

FIG. 8 is a flowchart showing an example of a processing procedure in the computation unit 303. An X axis and a Y axis are set in a horizontal direction and a vertical direction of an image. A pixel in the image is represented by the X axis (0 to Xmax) and the Y axis (0 to Ymax). In other words, a number of the pixels in an X direction is (Xmax+1) and a number of pixels in a Y direction is (Ymax+1).

In accordance with a following procedure, the respective subtle level differences in the X direction and the Y direction (the horizontal direction and the vertical direction) are eliminated for each pixel in the image.

(1) Storage of Image Data into Computation Buffer 304 (Step S11)

Luminance data in a range of ±4 pixels in the X and Y directions of the pixel to be processed are stored in variables Xp[0] to Xp[9] and Yp[0] to Yp[9] in the computation buffer 304. This is for the sake of efficiency in processing. Incidentally, Xp[5] and Yp[5] are luminance data in the pixel to be processed and have the same value.

(2) Processing of Image Edge (Step S12)

If the pixel to be processed is in an edge neighborhood (near "0 (zero)" or Xmax in the X axis, or near "0 (zero)" or Ymax in the Y axis) of the image, an edge processing is performed. In such a case, the luminance data in the range of ±4 pixels in the X and Y directions of the pixel to be processed may not exist. In such a case, tentative luminance data are written into the computation buffer 304. The tentative luminance data are, for example, luminance data in an image edge.

(3) Extraction of Subtle Variation per Frequency Component (Steps S131 to S138)

The subtle variation is extracted per frequency component in the respective X and Y directions. As a result, subtle variation amounts Xs[1] to Xs[4] and Ys[1] to Ys[4] are calculated. This procedure of the subtle variation extraction is a procedure similar to those in the subtle variation extracting units 121 to 124 and 151 to 154, and a detailed description will be refrained.

(4) Calculation of Average Value of Subtle Variation (Step S14)

In accordance with a following formula (6), an average value XYg of the calculated subtle variation amounts Xs[1] to Xs[4] and Ys[1] to Ys[4] is calculated. This formula (6) is substantially the same as the formula (4) already described.

$$XYav=(Xs[1]+ \ldots +Xs[4]+Ys[1]+ \ldots +Ys[4])/8 \quad \text{formula (6)}$$

This average value XYav has a meaning as a subtle level difference component in both the X and Y directions.

(5) Subtraction of Average Value XYav from Luminance Value Xp[5] of Pixel to be Processed (Step S15)

The average value XYav is subtracted from the luminance value Xp[5] of the pixel to be processed to calculate pixel data XYout in which the subtle level difference component is reduced.

$$XYout=Xp[5]-XYav \quad \text{formula (7)}$$

(6) Output of Pixel Data XYout (Step S16)

The pixel data XYout having been processed are outputted from the computation unit 303 and written into the image buffer 302.

The pixel to be processed is replaced and the above processing is repeated. As a result, a processed image is written into the image buffer 302 and displayed on the display unit 308 by the display control unit 307.

Other Embodiments

The embodiment of the present invention is not limited to the above embodiment and can be expanded or modified, and an expanded or modified embodiment is included in the technical scope of the present invention.

In the above embodiment, the subtle level difference in the luminance signal Y is reduced. A subtle level difference in color signals Cr, Cb may be reduced. The subtle difference can be reduced from the color signals Cr, Cb in addition to from the luminance signal Y. In such a case, for each of the color signals Cr, Cb, configurations similar to the vertical processing unit 105 and the horizontal processing unit 106, for example, are added.

What is claimed is:

1. An image processing apparatus, comprising:
   a resolution unit resolving an image signal into a plurality of frequency components whose spatial frequencies are different from each other;
   an extracting unit extracting a variation component of the image signal based on each of the plurality of frequency components, an absolute value of the variation component being smaller than a predetermined reference value;
   a calculating unit calculating a level difference amount of the image signal based on the extracted variation component; and
   a subtracting unit subtracting the calculated level difference amount from the image signal.

2. The image processing apparatus according to claim 1, wherein the calculating unit calculates the level difference amount based on an average value of the extracted variation components.

3. The image processing apparatus according to claim 1, further comprising a variation amount calculating unit calculating a variation amount of the image signal in each of the plurality of resolved frequency component,
   wherein the extracting unit extracts the variation component whose absolute value is smaller than the predetermined reference value from each of the variation amounts.

4. The image processing apparatus according to claim 3, wherein the valuation amount calculating unit calculates the valuation amount based on a valuation trend of the image signal in each of the plurality of frequency components.

5. The image processing apparatus according to claim 4, wherein the image signal has a plurality of pixel signals; and
   the frequency component is composed of a combination of the plurality of pixel signals.

6. The image processing apparatus according to claim 5, wherein the variation amount calculating unit calculates the variation amount with a center pixel of each frequency component being a reference, when the signal of the frequency component is in an increasing trend or in a decreasing trend.

7. The image processing apparatus according to claim 5, wherein the variation amount calculating unit calculates the variation amount based on pixels of both ends of each frequency component, when the signal of the frequency component is neither in the increasing trend nor in the decreasing trend.

8. The image processing apparatus according to claim 1, wherein the image signal is at least either one of a luminance signal or a color signal.

9. The image processing apparatus according to claim 1, further comprising
a display unit displaying an image based on the subtracted image signal.

10. An image processing method, comprising:
resolving an image signal into a plurality of frequency components whose spatial frequencies are different from each other;
extracting a variation component of the image signal based on each of the plurality of frequency components, an absolute value of the variation component being smaller than a predetermined reference value;
calculating a level difference amount of the image signal based on the extracted variation component; and
subtracting the calculated level difference amount from the image signal.

* * * * *